United States Patent
US 12,397,767 B2
Sakashita
Aug. 26, 2025

(54) DISC BRAKE

(71) Applicant: Hitachi Astemo, Ltd., Hitachinaka (JP)

(72) Inventor: Takayasu Sakashita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 455 days.

(21) Appl. No.: 17/796,108

(22) PCT Filed: Jan. 27, 2021

(86) PCT No.: PCT/JP2021/002742
§ 371 (c)(1),
(2) Date: Jul. 28, 2022

(87) PCT Pub. No.: WO2021/157438
PCT Pub. Date: Aug. 12, 2021

(65) Prior Publication Data
US 2023/0080487 A1    Mar. 16, 2023

(30) Foreign Application Priority Data
Feb. 4, 2020 (JP) ................................. 2020-017075

(51) Int. Cl.
*B60T 13/74*    (2006.01)
*F16D 65/18*    (2006.01)
(Continued)

(52) U.S. Cl.
CPC ............ *B60T 13/746* (2013.01); *F16D 65/18* (2013.01); *F16D 2121/24* (2013.01); *F16D 2125/06* (2013.01); *F16D 2125/40* (2013.01)

(58) Field of Classification Search
CPC .. F16D 65/18; F16D 2125/40; F16D 2121/24; F16D 2123/00; F16D 2127/06;
(Continued)

(56) References Cited

U.S. PATENT DOCUMENTS 3,688,875 A * 9/1972 De Hoff ................ F16D 65/567
188/71.9
5,219,047 A * 6/1993 Fouilleux ............. F16D 65/567
188/71.9
(Continued)

FOREIGN PATENT DOCUMENTS

JP    2007100725 A * 4/2007
JP    2008240874 A * 10/2008
(Continued)

OTHER PUBLICATIONS

KR 20160016610 A (Year: 2016).*
(Continued)

*Primary Examiner* — Robert A. Siconolfi
*Assistant Examiner* — Mahbubur Rashid
(74) *Attorney, Agent, or Firm* — Wenderoth, Lind & Ponack, L.L.P.

(57) ABSTRACT

A disk brake includes: a piston, which has a bottomed cylindrical shape, and is configured to press braking members against a braked member; a thrust member configured to thrust the piston through rotation of a rotary member configured to be driven by an electric machine; a rotation stopping member configured to restrict rotation of the thrust member relative to the piston; an engaging portion, which is on an inner side of the piston, and is configured to restrict rotation of the rotation stopping member through engagement; and a fixing member configured to restrict movement of the rotation stopping member in an axial direction relative to the piston.

9 Claims, 6 Drawing Sheets

(51) Int. Cl.
*F16D 121/24* (2012.01)
*F16D 125/06* (2012.01)
*F16D 125/40* (2012.01)

(58) Field of Classification Search
CPC ............. F16D 65/183; F16D 2066/005; F16D 2065/386; F16D 55/46; F16D 2125/06; F16D 2125/34; F16D 2125/58; F16D 65/14; F16D 65/54; F16D 2127/02; F16D 2127/08; F16D 59/02; F16D 2121/12; F16D 2125/44; F16D 2125/56; F16D 49/08; F16D 55/22; F16D 55/30; F16D 63/006; F16D 65/52; F16D 65/56; B60T 13/741; B60T 13/746; B60T 1/005
See application file for complete search history.

(56) References Cited

U.S. PATENT DOCUMENTS

| | | | | |
|---|---|---|---|---|
| 8,177,038 | B2* | 5/2012 | Watada | F16D 65/18 188/71.8 |
| 8,286,758 | B2* | 10/2012 | Miura | F16D 65/567 188/71.9 |
| 8,302,741 | B2* | 11/2012 | Chen | F16D 65/567 188/71.9 |
| 8,733,513 | B2* | 5/2014 | Takahashi | F16D 65/567 188/71.9 |
| 9,151,385 | B2* | 10/2015 | Winkler | F16J 1/006 |
| 9,568,058 | B2* | 2/2017 | Sakashita | F16D 55/226 |
| 10,352,384 | B2* | 7/2019 | Satoh | F16D 65/092 |
| 10,393,200 | B2* | 8/2019 | Kim | F16H 25/2018 |
| 10,570,973 | B2* | 2/2020 | Leidecker | F16D 65/18 |
| 2004/0112689 | A1* | 6/2004 | Nakayama | F16D 65/18 188/71.9 |
| 2005/0034935 | A1* | 2/2005 | Maehara | F16D 65/567 188/71.9 |
| 2007/0045062 | A1* | 3/2007 | Watada | F16D 65/567 188/72.8 |
| 2011/0315007 | A1 | 12/2011 | Koch et al. | |
| 2012/0325597 | A1* | 12/2012 | Giering | F16D 65/14 188/72.3 |
| 2014/0095042 | A1 | 4/2014 | Sakashita et al. | |
| 2014/0158480 | A1* | 6/2014 | Qian | B60T 11/102 188/72.8 |
| 2014/0208940 | A1* | 7/2014 | Leidecker | F16J 1/005 92/172 |
| 2019/0145505 | A1* | 5/2019 | Bourlon | F16D 55/226 188/72.8 |

FOREIGN PATENT DOCUMENTS

| | | | |
|---|---|---|---|
| JP | 2009127737 A | * | 6/2009 |
| JP | 2011-501073 | | 1/2011 |
| JP | 5898035 | | 3/2016 |

OTHER PUBLICATIONS

JP 5968192 B2 (Year: 2016).*
JP 2019011848 A (Year: 2019).*
International Search Report issued Mar. 16, 2021 in corresponding International Application No. PCT/JP2021/002742, with English language translation.
Written Opinion of the International Searching Authority issued Mar. 16, 2021 in corresponding International Application No. PCT/JP2021/002742, with English language translation.

* cited by examiner (a)

(b)

(a)

(b)

DISC BRAKE

CROSS-REFERENCE TO RELATED APPLICATION

The present application claims priority based on Japanese Patent Application No. 2020-017075 filed on Feb. 4, 2020. All disclosed contents including the Specification, the Scope of the Claims, the Drawings, and the Abstract of Japanese Patent Application No. 2020-017075 are incorporated herein by reference in their entirety.

TECHNICAL FIELD

The present invention relates to a disc brake to be used for braking of a vehicle.

BACKGROUND ART

There is known a disc brake including an electric parking brake as a braking device for a vehicle. For example, a disc brake described in JP 5898035 B2 includes an electric actuator and a rotary-to-linear motion conversion mechanism. The rotary-to-linear motion conversion mechanism converts a rotary motion of the electric actuator into a linear motion to thrust a piston. The rotary-to-linear motion conversion mechanism includes a screw member and a linearly movable member. The screw member receives rotation of the electric actuator transmitted to the screw member. The linearly movable member is threadably engaged with the screw member, and is linearly moved by the rotation of the screw member to thrust the piston. The linearly movable member is supported so as to be movable in an axial direction relative to the piston and nonrotatable relative to the piston. More specifically, the linearly movable member has an engagement protruding portion. The engagement protruding portion protrudes radially outward from an outer peripheral surface of the linearly movable member. When the engagement protruding portion of the linearly movable member is engaged with an engagement recessed portion of an inner peripheral surface of the piston, the linearly movable member is allowed to move in the axial direction relative to the piston while being nonrotatable relative to the piston.

SUMMARY OF INVENTION

Technical Problem

In the rotary-to-linear motion conversion mechanism included in the disc brake described in JP 5898035 B2 mentioned above, on an outer peripheral side of the linearly movable member thereof, specifically, a thrust member that thrusts the piston, the engagement protruding portion that allows the linearly movable member to move in the axial direction while being nonrotatable relative to the piston protrudes radially outward. This thrust member is formed integrally by forging. However, when the engagement protruding portion of the thrust member is formed by forging so as to protrude radially outward, the amount of plastic deformation of a material is large, which causes problems such as an increase in manufacturing cost due to an increase in the number of processing steps. In particular, as the size of the piston increases, the amount of plastic deformation increases, resulting in disadvantageous conditions.

The present invention has an object to provide a disc brake including a rotary-to-linear motion conversion mechanism including a thrust member that is easy to manufacture.

Solution to Problem

According to one embodiment of the present invention, there is provided a disc brake including: a piston, which has a bottomed cylindrical shape, and is configured to press braking members against a braked member; a thrust member configured to thrust the piston through rotation of a rotary member driven by an electric machine; a rotation stopping member configured to restrict rotation of the thrust member relative to the piston; an engaging portion, which is formed on an inner side of the piston, and is configured to restrict rotation of the rotation stopping member and stop the rotation stopping member through engagement; and a fixing portion configured to restrict movement of the rotation stopping member in an axial direction relative to the piston.

The disc brake according to one embodiment of the present invention includes the rotary-to-linear motion conversion mechanism including, in particular, the thrust member that is easy to manufacture.

DESCRIPTION OF EMBODIMENTS

Figure 1:
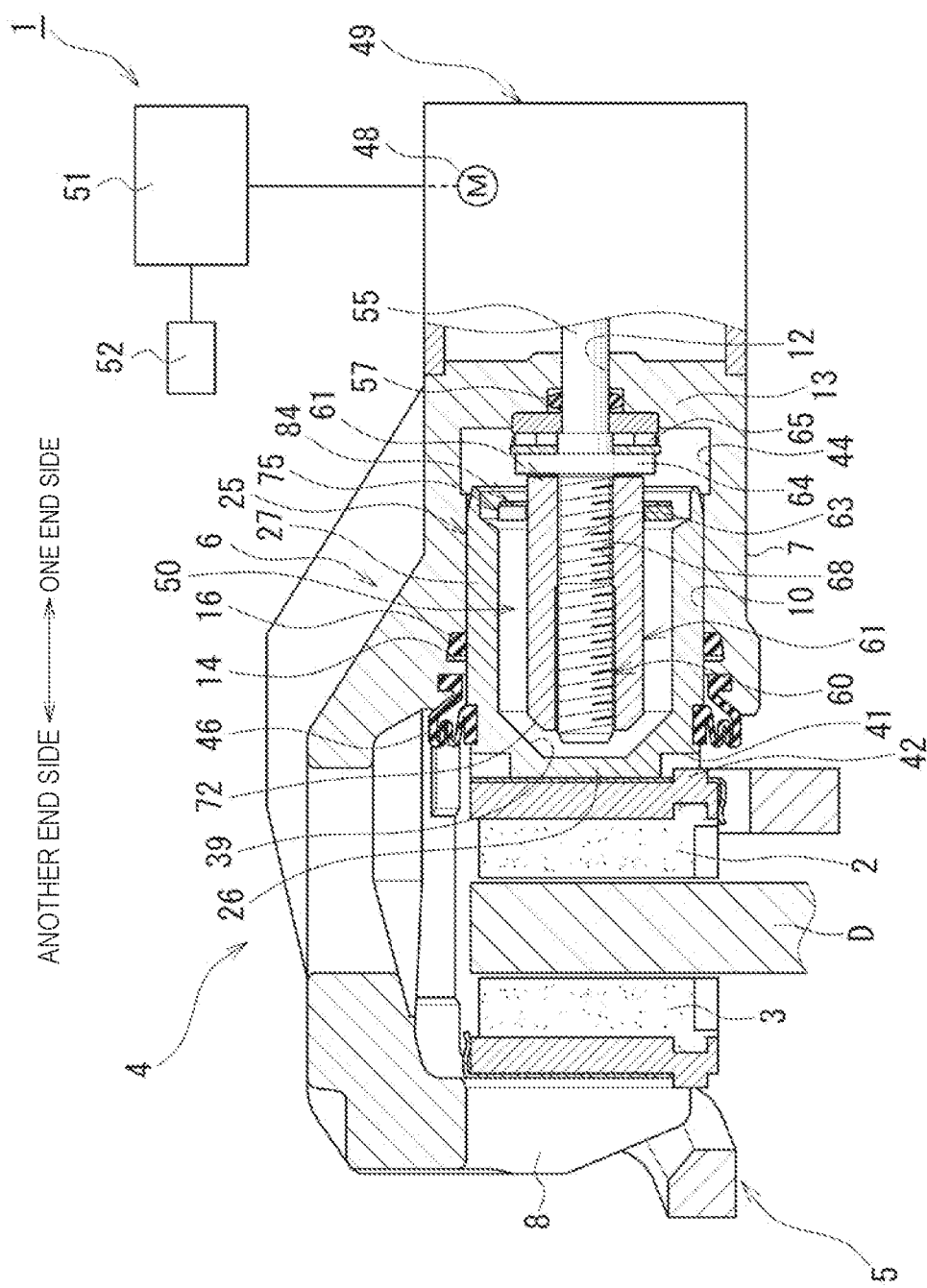
FIG. 1 is a sectional view of a main part of a disc brake according to an embodiment of the present invention.

Now, a disc brake 1 according to embodiments of the present invention is described with reference to FIG. 1 to FIG. 7. In the following description, for convenience of the description, a right side in FIG. 1 is referred to as one end side of the disc brake 1, and a left side is referred to as another end side of the disc brake 1. A right-and-left direction in FIG. 1 corresponds to an axial direction of the disc brake 1.

As illustrated in FIG. 1, the disc brake 1 according to this embodiment includes a pair of inner and outer brake pads 2, 3 and a floating caliper 4. The pair of inner and outer brake pads 2, 3 are arranged on both sides of a disc rotor D mounted to a rotary portion (not shown) of a vehicle in the axial direction so as to sandwich the disc rotor D. The pair of inner and outer brake pads 2, 3 and the floating caliper 4 are supported by a carrier 5 so as to be movable in the axial direction. The carrier 5 is fixed to a non-rotary portion (not shown) of the vehicle, such as a knuckle. The pair of inner and outer brake pads 2, 3 correspond to braking members. The disc rotor D corresponds to a braked member.

A caliper main body 6, which is a principal part of the caliper 4, includes a cylinder portion 7 on a proximal end side (one end side) and a claw portion 8 on a distal end side (another end side). The claw portion 8 extends from the cylinder portion 7 to another end side while passing over the disc rotor D. A cylinder 10 is provided inside the cylinder 7. A piston 25 is fitted into the cylinder 10 so as to be slidable in the axial direction. The cylinder 10 is open on another end side, and is closed on one end side with a bottom portion 13 having a shaft hole 12. The cylinder 10 has an annular groove 14 in its inner peripheral surface on another end side. A piston seal 16 is provided in the annular groove 14.

Figure 2:
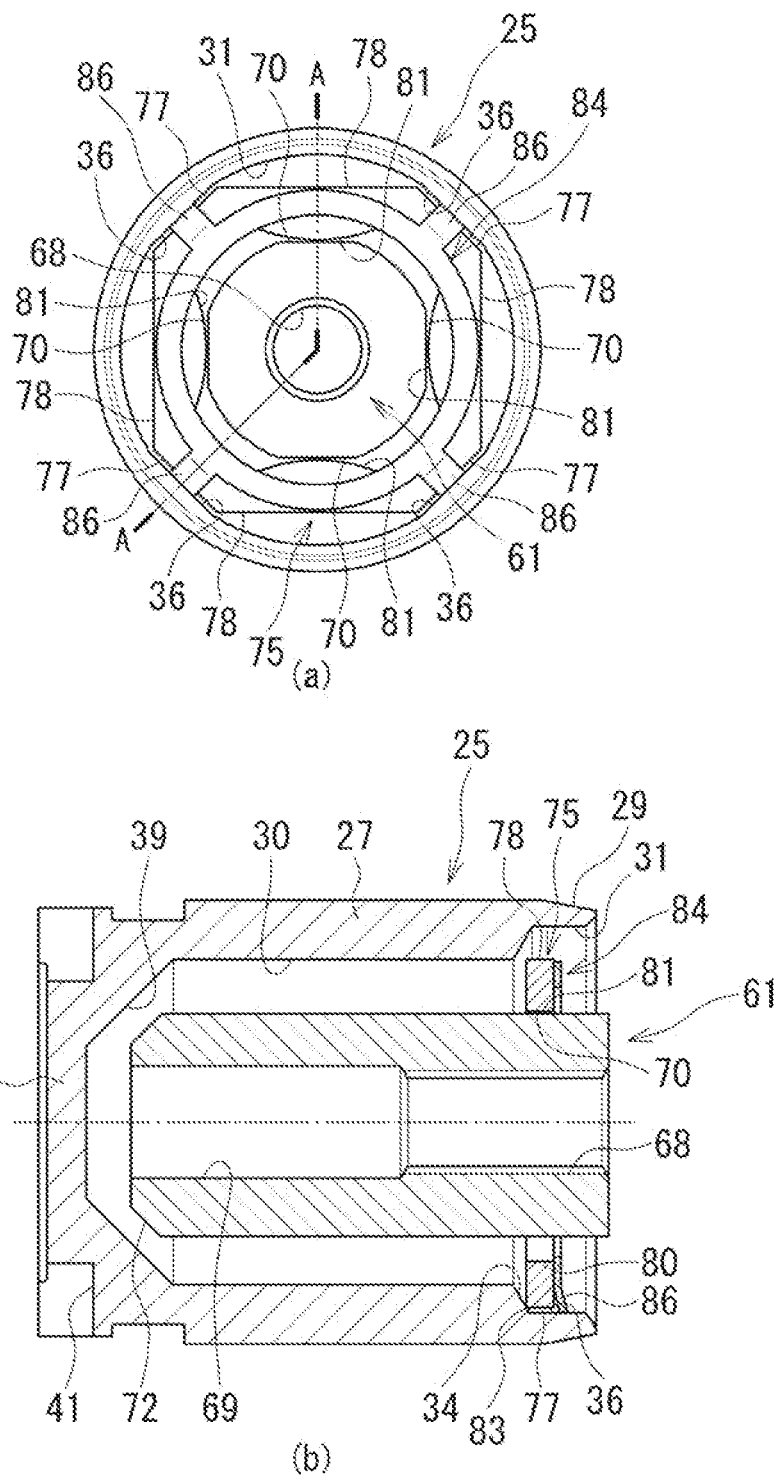
FIG. 2 are views for illustrating an interior of a piston of the disc brake according to the embodiment of the present invention, in which FIG. 2(*a*) is an end view for illustrating the interior of the piston and FIG. 2(*b*) is a sectional view taken along the line A-A of FIG. 2(*a*).
Figure 3:
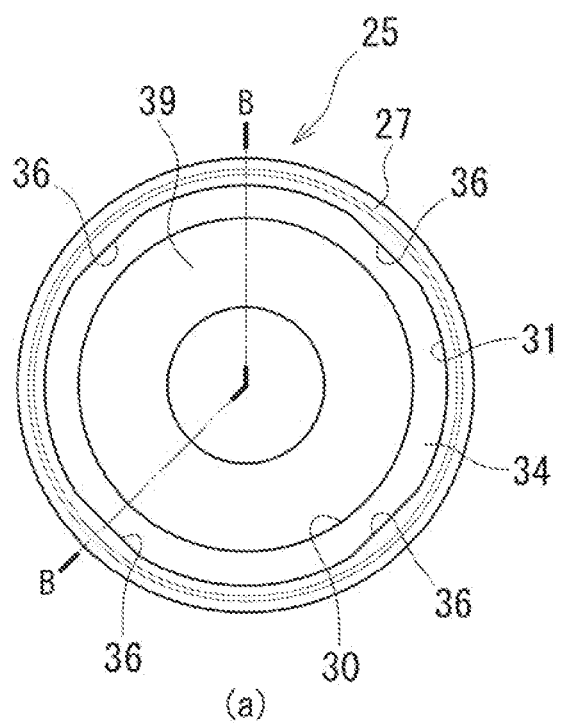
FIG. 3(*a*) is an end view of the piston included in the disc brake according to the embodiment, and FIG. 3(*b*) is a sectional view taken along the line B-B of FIG. 3(*a*).
Figure 3:
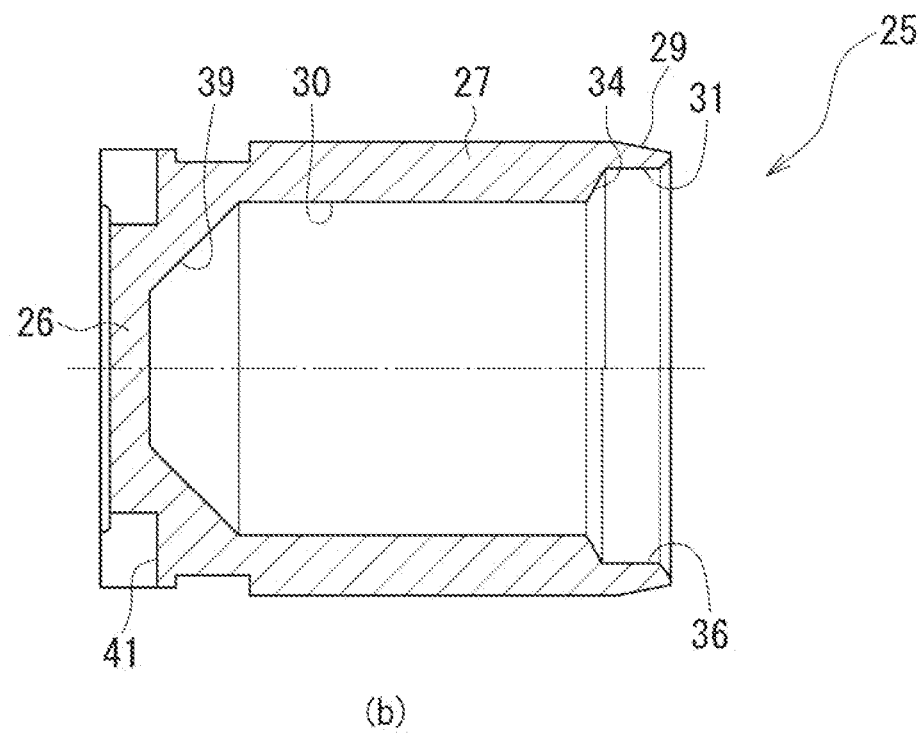

As illustrated in FIG. 1, also referring to FIG. 2 and FIGS. 3, the piston 25 has a bottomed cylindrical shape formed of a bottom portion 26 and a cylindrical portion 27. The piston 25 is arranged so that the bottom portion 26 is opposed to the inner brake pad 2. The piston 25 is fitted into the cylinder 10 so as to be slidable in the axial direction. As illustrated in FIG. 2 and FIGS. 3, an outer peripheral surface of the cylindrical portion 27 includes an inclined surface 29 having an annular shape at its one end. The inclined surface 29 has an outer diameter gradually decreasing toward the one end. Meanwhile, the cylindrical portion 27 has on its inner side, a small-diameter opening portion 30 and a large-diameter opening portion 31. The large-diameter opening portion 31 is continuous from one end of the small-diameter opening portion 30, and is located on one end side. The large-diameter opening portion 31 has an inner diameter larger than that of the small-diameter opening portion 30. The small-diameter opening portion 30 is formed so as to have a length in the axial direction significantly larger than that of the large-diameter opening portion 31. An inner peripheral surface of the large-diameter opening portion 31 and an inner peripheral surface of the small-diameter opening portion 30 are connected to each other through intermediation of a first tapered surface 34 having an annular shape. The first tapered surface 34 has a diameter gradually increasing toward one end side.

The inner peripheral surface of the large-diameter opening portion 31 includes two pairs of flat surface portions 36, 36. The flat surface portions 36, 36 of each pair are opposed to each other. In other words, the flat surface portions 36, 36 are formed at four positions on the inner peripheral surface of the large-diameter opening portion 31 at 90-degree intervals in a circumferential direction. The flat surface portions 36, 36 extend over a substantially entire range of the large-diameter opening portion 31 in the axial direction from one end of the large-diameter opening portion 31 to the first tapered surface 34. In this embodiment, the flat surface portions 36, 36 are formed at four positions on the inner peripheral surface of the large-diameter opening portion 31. However, the flat surface portions 36 may be formed at one to three positions, or five or more positions. Each of the flat surface portions 36 corresponds to an engaging portion.

A surface of the bottom portion 26 of the piston 25 on one end side and an inner peripheral surface of the small-diameter opening portion 30 are connected through intermediation of a second tapered surface 39 having an annular shape. The second tapered surface 39 has a diameter gradually increasing toward one end side. Further, an outer peripheral edge portion of the bottom portion 26 of the piston 25 has a plurality of recessed portions 41 arranged at intervals in the circumferential direction. Referring to FIG. 1, protruding portions 42 on a rear surface of the inner brake pad 2 are engaged with corresponding ones of the recessed portions 41, respectively. This engagement makes the piston 25 nonrotatable relative to the cylinder 10 and also to the caliper main body 6. As illustrated in FIG. 1, an outer peripheral surface of the cylindrical portion 27 of the piston 25 is in contact with the piston seal 16. A hydraulic chamber 44 is defined by the piston seal 16 and a sealing member 57 described later between the piston 25 and the bottom portion 13 of the cylinder 10. In the hydraulic chamber 44, a hydraulic pressure is supplied from a hydraulic source (not shown) such as a master cylinder or a hydraulic-pressure control unit via a port (not shown) of the cylinder portion 7. A dust boot 46 is provided between an outer peripheral surface of the cylindrical portion 27 of the piston 25 on another end side and an inner peripheral surface of the cylinder 10 on another end side.

As illustrated in FIG. 1, a motor gear unit 49 and a rotary-to-linear motion conversion mechanism 50 are provided to the caliper main body 6. The motor gear unit 49 includes an electric motor 48 being an electric machine and a speed reduction mechanism (not shown). The rotary-to-linear motion conversion mechanism 50 receives rotation of the motor gear unit 49 transmitted to the rotary-to-linear motion conversion mechanism 50. An electronic control unit 51 that controls drive of the electric motor 48 is connected to the electric motor 48 of the motor gear unit 49. A parking switch 52 is connected to the electronic control unit 51. The parking switch 52 is operated to turn a parking brake ON/OFF. The electronic control unit 51 can actuate the parking brake based on a signal from the vehicle regardless of whether or not the parking switch 52 has been operated. The speed reduction mechanism of the motor gear unit 49 includes, for example, a spur gear multi-stage speed reduction mechanism and a planetary gear speed reduction mechanism. An output shaft 55 extending from the motor gear unit 49 is inserted into the shaft hole 12 of the bottom portion 13 of the cylinder 10 so as to be rotatable. The sealing member 57 is provided between an outer peripheral surface of the output shaft 55 and an inner peripheral surface of the shaft hole 12.

The rotary-to-linear motion conversion mechanism 50 converts a rotary motion of the motor gear unit 49 into a linear motion to thrust the piston 25, and retains the piston 25 in a braking position. The rotary-to-linear motion conversion mechanism 50 is arranged inside the cylinder 10. The rotary-to-linear motion conversion mechanism 50 includes a spindle 60 and a nut member 61. The spindle 60 is a rotary member, and has a male thread portion 63. The nut member 61 is a thrust member, which is threadably engaged with the spindle 60 to thrust the piston 25. The spindle 60 has the male thread portion 63 and a flange portion 64. The flange portion 64 is formed at one end of the male thread portion 63. The flange portion 64 has an annular shape, and protrudes radially outward from an outer peripheral surface of the male thread portion 63. The output shaft 55 is connected to one end side of the flange portion 64 of the spindle 60 so as to be nonrotatable relative to the spindle 60. As a result, a rotational torque output from the motor gear unit 49 is transmitted to the spindle 60. The male thread portion 63 of the spindle 60 is arranged so that its other end is located in proximity to the bottom portion 26 of the piston 25. A thrust bearing 65 is provided between one end surface of the flange portion 64 of the spindle 60 and the bottom portion 13 of the cylinder 10.

As illustrated in FIG. 1, the nut member 61 is threadably engaged with the male thread portion 63 of the spindle 60. Also referring to FIGS. 4, the nut member 61 has a cylindrical shape. Two pairs of flat surface portions 70, 70 are formed on an outer peripheral surface of the nut member 61. The flat surface portions 70, 70 of each pair are opposed to each other. In other words, the flat surface portions 70, 70 are formed at four positions on the outer peripheral surface of the nut member 61 at 90-degree intervals in the circumferential direction. The flat surface portions 70, 70 extend over the entire range of the nut member 61 in the axial direction. In this embodiment, the four flat surface portions 70, 70 are formed at four positions on the outer peripheral surface of the nut member 61. However, the flat surface portions 70 may be formed at one to three positions, or five or more positions. The nut member 61 has a female thread portion 68 on its inner side. The female thread portion 68 extends from its substantial center in the axial direction to one end side. The nut member 61 has an opening portion 69 on its other end side. The opening portion 69 is continuous with the female thread portion 68. The opening portion 69 has an inner diameter set larger than that of the female thread portion 68. The male thread portion 63 of the spindle 60 and the female thread portion 68 of the nut member 61 are threadably engaged with each other. The nut member 61 corresponds to a thrust member.

Figure 4:
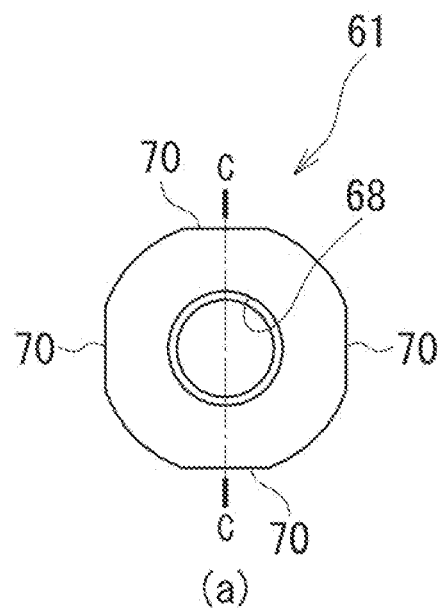
FIG. 4(*a*) is an end view of a nut member included in the disc brake according to the embodiment, and FIG. 4(*b*) is a sectional view taken along the line C-C of FIG. 4(*a*).
Figure 4:
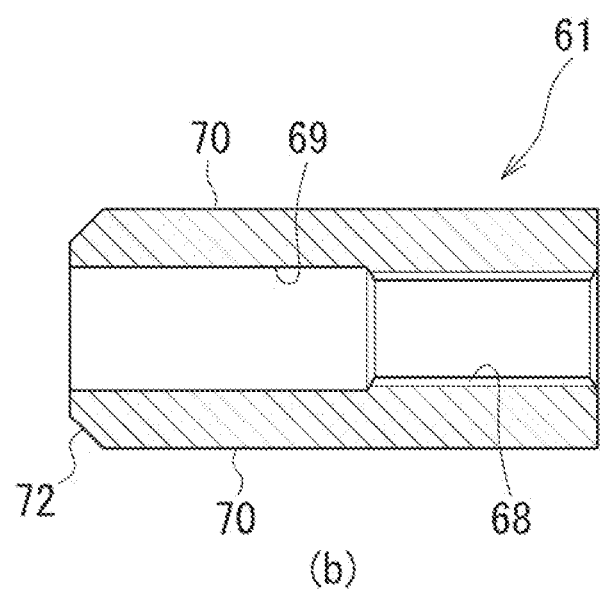
Figure 5:
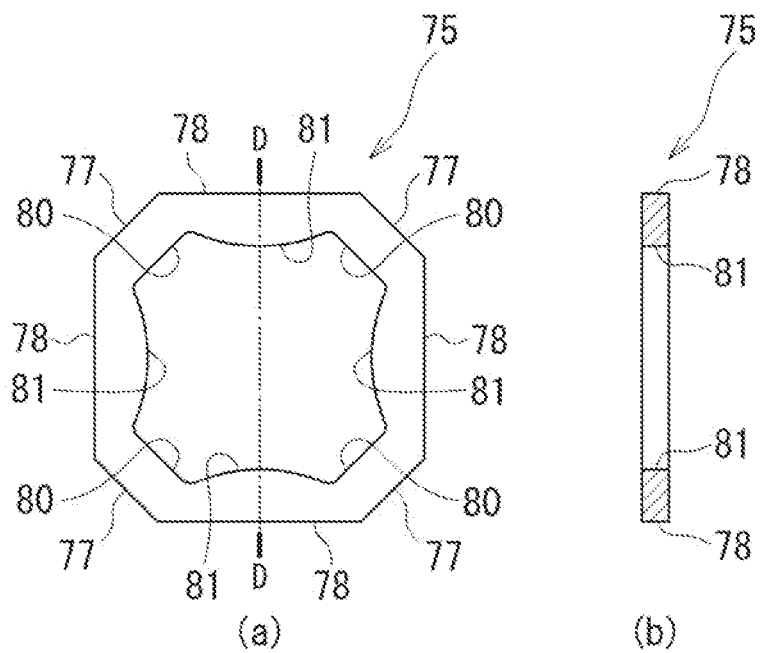
FIG. 5(*a*) is a front view of a rotation stopping member included in the disc brake according to the embodiment, and FIG. 5(*b*) is a sectional view taken along the line D-D of FIG. 5(*a*).

A thread engagement portion between the male thread portion 63 of the spindle 60 and the female thread portion 68 of the nut member 61 is set to have a reversed efficiency of 0 or smaller. Thus, the spindle 60 cannot be rotated with thrust acting on the nut member 61 in the axial direction. Specifically, the thread engagement portion can convert the rotational torque output from the spindle 60 into thrust on the nut member 61 in the axial direction, but cannot convert thrust of the nut member 61 in the axial direction into a rotational torque for the spindle 60. Referring to FIG. 2 and FIGS. 4, an inclined surface 72 is formed on an outer peripheral surface of the nut member 61 at its other end. The inclined surface 72 has an annular shape, and has an outer diameter gradually decreasing toward another end side. An inclination angle of the inclined surface 72 with respect to a radial direction is substantially the same as an inclination angle of the second tapered surface 39 on the inner side of the piston 25 with respect to the radial direction.

As illustrated in FIGS. 2, a rotation stopping member 75 is provided between the inner peripheral surface of the large-diameter opening portion 31 of the piston 25 and the outer peripheral surface of the nut member 61. The rotation stopping member 75 restricts rotation of the nut member 61 relative to the piston 25. Also referring to FIGS. 5, the rotation stopping member 75 is formed of a plate member having an annular shape. On an outer peripheral surface of the rotation stopping member 75, two pairs of short-side portions 77, 77 are formed, and two pairs of long-side portions 78, 78 are formed. The short-side portions 77, 77 of each pair are opposed to each other, and the long-side portions 78, 78 of each pair are opposed to each other. In other words, on the outer peripheral surface of the rotation stopping member 75, the short-side portions 77 are formed at four positions and the long-side portions 78 are formed at four positions, all of which are arranged alternately in the circumferential direction. In other words, the rotation stopping member 75 has an octagonal shape in plan view. Both of the short-side portion 77 and the long-side portion 78 extend linearly. A length of the long-side portion 78 is set larger than a length of the short-side portion 77. In this embodiment, on the outer peripheral surface of the rotation stopping member 75, the short-side portions 77 are formed at four positions and the long-side portions 78 are formed at four positions, all of which extend linearly and are arranged alternately. However, linear portions and arc-shaped portions may be arranged in a mixed manner.

Meanwhile, on an inner peripheral surface of the rotation stopping member 75, two pairs of linear portions 80, 80 and two pairs of convexly curved portions 81, 81 are formed. The linear portions 80 of each pair are opposed to each other, and the convexly curved portions 81 of each pair are opposed to each other. In other words, on the inner peripheral surface of the rotation stopping member 75, the linear portions 80 are formed at four positions, and the convexly curved portions 81 are formed at four positions, all of which are arranged alternately in the circumferential direction. The convexly curved portion 81 protrudes in an arc-like manner toward a center of the rotation stopping member 75. The convexly curved portion 81 may have a linear top portion. The long-side portions 78 of the outer peripheral surface of the rotation stopping member 75 and the convexly curved portions 81 of the inner peripheral surface of the rotation stopping member 75 are opposed to each other, respectively. Meanwhile, the short-side portions 77 of the outer peripheral surface of the rotation stopping member 75 and the linear portions 80 of the inner peripheral surface thereof are opposed to each other.

In this embodiment, on the outer peripheral surface of the rotation stopping member 75, the short-side portions 77 are formed at four positions so as to correspond to the flat surface portions 36 of the inner peripheral surface of the large-diameter opening portion 31 of the piston 25. However, the short-side portions 77 are not limited to the arrangement described above. The short-side portions 77 are only required to be arranged so as to correspond to the flat surface portions 36 of the inner peripheral surface of the large-diameter opening portion 31 of the piston 25. Further, on the inner peripheral surface of the rotation stopping member 75, the convexly curved portions 81 are formed at four positions so as to correspond to the flat surface portions 70 of the outer peripheral surface of the nut member 61. However, the convexly curved portions 81 are not limited to the arrangement described above. The convexly curved portions 81 are only required to be arranged so as to correspond to the flat surface portions 70 of the outer peripheral surface of the nut member 61.

As illustrated in FIGS. 2, the rotation stopping member 75 is arranged between the inner peripheral surface of the large-diameter opening portion 31 of the piston 25 and the outer peripheral surface of the nut member 61. An outer peripheral edge of the rotation stopping member 75 on another end side is brought into abutment against one end of the first tapered surface 34 of the piston 25 at an abutment portion 83. As is understood from FIG. 2(a), the rotation stopping member 75 is arranged so that the short-side portions 77, 77 of the outer peripheral surface of the rotation stopping member 75 and the flat surface portions 36, 36 of the inner peripheral surface of the large-diameter opening portion 31 of the piston 25 are in abutment against each other. As a result, the rotation stopping member 75 and the piston 25 are made nonrotatable relative to each other, and are restricted from moving in the radial direction relative to each other. In this embodiment, the rotation stopping member 75 and the piston 25 are made nonrotatable relative to each other by the short-side portions 77 of the outer peripheral surface of the rotation stopping member 75 and the flat surface portions 36 of the inner peripheral surface of the large-diameter opening portion 31 of the piston 25. However, another relative rotation restriction means such as recess-protrusion engagement, spline engagement, or polygonal engagement may be provided between the outer peripheral surface of the rotation stopping member 75 and the inner peripheral surface of the large-diameter opening portion 31 of the piston 25.

Further, the rotation stopping member 75 is arranged so that top surfaces of the convexly curved portions 81, 81 of the inner peripheral surface of the rotation stopping member 75 and the flat surface portions 70, 70 of the outer peripheral surface of the nut member 61 are brought into abutment against each other. As a result, the rotation stopping member 75 and the nut member 61 are made nonrotatable relative to each other, but the nut member 61 is allowed to move in the axial direction. In this embodiment, the rotation stopping member 75 and the nut member 61 are nonrotatable relative to each other by the convexly curved portions 81 of the inner peripheral surface of the rotation stopping member 75 and the flat surface portions 70 of the outer peripheral surface of the nut member 61. However, another relative rotation restriction means such as recess-protrusion engagement, spline engagement, or polygonal engagement may be provided between the inner peripheral surface of the rotation stopping member 75 and the outer peripheral surface of the nut member 61.

As a result, the nut member 61 is made nonrotatable relative to the piston 25 by the rotation stopping member 75, but is movable in the axial direction. Further, as illustrated in FIG. 2(a), sufficient gaps are defined by the outer peripheral surface of the nut member 61 except for the flat surface portions 70 and the linear portions 80 of the inner peripheral surface of the rotation stopping member 75. Further, sufficient gaps are defined by the inner peripheral surface of the piston 25 except for the flat surface portions 36 and the long-side portions 78 of the outer peripheral surface of the rotation stopping member 75. These gaps are secured as air communication paths at a time of air ventilation. Thus, residual air, which may remain when a hydraulic pressure is supplied from a hydraulic source to the hydraulic chamber 44 inside the caliper main body 6 (cylinder 10), can be reduced.

Figure 6:
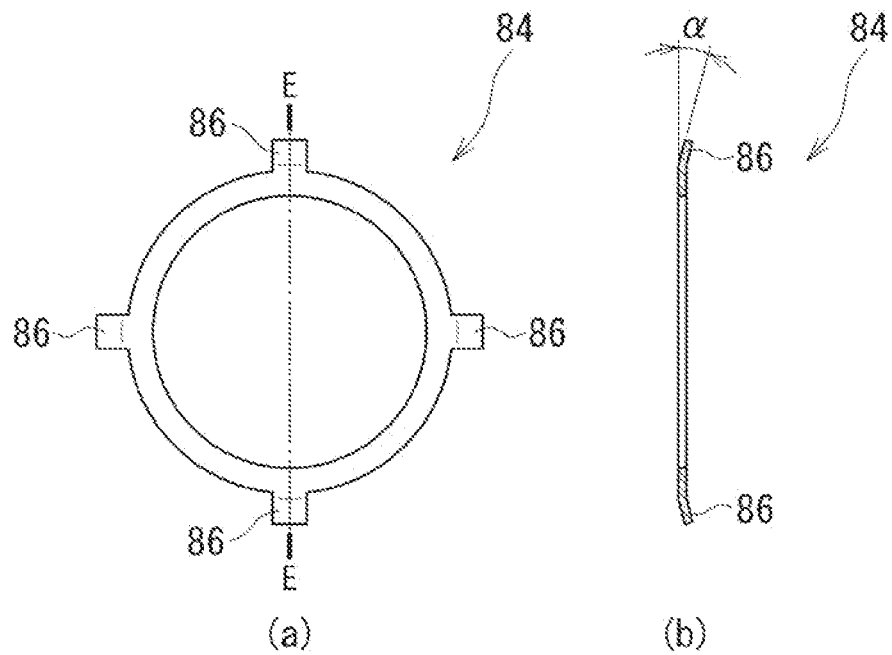
FIG. 6(*a*) is a front view of a fixing member included in the disc brake according to the embodiment, and FIG. 6(*b*) is a sectional view taken along the line E-E of FIG. 6(*a*).

Further, as illustrated in FIGS. 2, a fixing member 84 is provided on one end side of the rotation stopping member 75. The fixing member 84 urges the rotation stopping member 75 toward another end side, in other words, toward the abutment portion 83. The fixing member 84 restricts movement of the rotation stopping member 75 in the axial direction relative to the piston 25. Also referring to FIGS. 6, the fixing member 84 is formed of a leaf spring member having an annular shape with a given width. As illustrated in FIG. 2(a), an inner diameter of the fixing member 84 is sufficiently larger than an outer diameter of the nut member 61. An outer diameter of the fixing member 84 is sufficiently smaller than an inner diameter of the large-diameter opening portion 31 of the piston 25. The outer diameter of the fixing member 84 and a distance between one pair of long-side portions 78, 78 of the rotation stopping member 75 are substantially the same. Further, as illustrated in FIG. 2 and FIGS. 6, an outer peripheral surface of the fixing member 84 has a plurality of protruding portions 86 that are arranged at intervals in the circumferential direction. The protruding portions 86 protrude radially outward from the outer peripheral surface of the fixing member 84. Each of the protruding portions 86 has a substantially rectangular shape in plan view.

The protruding portions 86 extend while being slightly inclined with respect to a direction orthogonal to an axial direction of the fixing member 84. Referring to FIG. 2(b), the protruding portions 86 are inclined toward one end side under a state in which the fixing member 84 is placed in the large-diameter opening portion 31 of the piston 25. An inclination angle α of the protruding portion 86 is appropriately set to fall within a range of from 5 degrees to 30 degrees. In this embodiment, the inclination angle α is set to 15 degrees. In this embodiment, the protruding portions 86 are formed at four positions at 90-degree intervals. A distance between distal ends of one pair of protruding portions 86, 86 opposed to each other is slightly larger than a distance between one pair of flat surface portions 36, 36 of the inner peripheral surface of the large-diameter opening portion 31 of the piston 25, which are opposed to each other. In this embodiment, two pairs of protruding portions 86, 86, each of the pairs of protruding portions 86, 86 being opposed to each other, are formed. However, one, three, or four pairs of protruding portions 86 may be formed, and the number of pairs is not limited to the number used in this embodiment.

As illustrated in FIGS. 2, the fixing member 84 is provided inside the large-diameter opening portion 31 of the piston 25 so that the protruding portions 86 are opposed to the flat surface portions 36 of the piston 25, respectively, and another end surface of the fixing member 84 presses one end surface of the rotation stopping member 75. When the fixing member 84 is mounted, the protruding portions 86 are elastically deformed (warped) in such a manner that the inclination angle α increases. Thus, the fixing member 84 can easily be inserted into the large-diameter opening portion 31 of the piston 25. Further, after the fixing member 84 is mounted, the protruding portions 86 of the fixing member 84 remain warped. Thus, the protruding portions 86 are urged so that the distal ends of the protruding portions 86 press the flat surface portions 36 of the inner peripheral surface of the large-diameter opening portion 31 of the piston 25 with restoring forces of the protruding portions 86.

The fixing member 84 is a leaf spring member, and is sufficiently harder than the piston 25 made of a ferrous material used for forging. Thus, when a force in a removal direction, specifically, a load acting in a direction toward one end side is applied to the fixing member 84, the distal ends of the protruding portions 86 of the fixing member 84 plastically deform the flat surface portions 36 of the piston 25 in such a manner as to push into the flat surface portions 36 of the piston 25. As a result, the fixing member 84 is reliably fixed inside the large-diameter opening portion 31 of the piston 25. Then, the rotation stopping member 75 is pressed (urged) with the restoring forces of the protruding portions 86 of the fixing member 84 against the abutment portion 83 between the outer peripheral edge of the rotation stopping member 75 on another end side and the first tapered surface 34 of the piston 25, and is retained in this position.

As a result, movement of the rotation stopping member 75 in the axial direction relative to the piston 25 is restricted by the fixing member 84. Further, as illustrated in FIG. 2(a), sufficient gaps are defined by the outer peripheral surface of the nut member 61 except for the flat surface portions 70 and the inner peripheral surface of the fixing member 84. Further, sufficient gaps are defined by the outer peripheral surface of the fixing member 84 except for the protruding portions 86 and the inner peripheral surface of the large-diameter opening portion 31 of the piston 25. These gaps are secured as air communication paths at the time of air ventilation. Thus, residual air, which may remain when a hydraulic pressure is supplied from the hydraulic source to the hydraulic chamber 44 inside the caliper main body 6 (cylinder 10), can be reduced. Further, the rotation stopping member 75 is urged toward the abutment portion 83 with the restoring forces of the protruding portions 86 of the fixing member 84. Thus, backlash in the axial direction between the rotation stopping member 75 and the fixing member 84 and backlash in the radial direction between the rotation stopping member 75 and the piston 25 can be suppressed. As a result, a fitting portion between the fixing member 84 and the rotation stopping member 75 and a fitting portion between the rotation stopping member 75 and the piston 25 are not required to be finished with high accuracy so as to suppress the backlash. Thus, dimensional accuracy can be reduced.

Next, an action of the disc brake 1 according to this embodiment is described.

When a brake pedal (not shown) is stepped on by a driver, a hydraulic pressure generated in accordance with the operation of the brake pedal is supplied to the hydraulic chamber 44 inside the caliper main body 6 (cylinder 10) via a master cylinder and a hydraulic circuit (both not shown). As a result, the piston 25 slides from its original position, which is a position when braking is not performed (see FIG. 1), toward another end side while elastically deforming the piston seal 16, and presses the inner brake pad 2 against the disc rotor D. Subsequently, the caliper 4 is moved by a reaction force of the piston 25 toward one end side relative to the carrier 5, and presses the outer brake pad 3 being in abutment against the claw portion 8 against the disc rotor D. As a result, the disc rotor D is sandwiched between the pair of inner and outer brake pads 2, 3 to generate a frictional force to thereby generate a braking force.

Meanwhile, when the brake pedal is released back by the driver, the supply of the hydraulic pressure from the master cylinder to the hydraulic chamber 44 is stopped to decrease the hydraulic pressure in the hydraulic chamber 44. As a result, a restoring force of the piston seal 16 through its elastic deformation causes the piston 25 to retract to the original position to thereby cancel the braking force. When the amount of movement of the piston 25 increases and exceeds a limit of the piston seal 16 along with wear of the inner and outer brake pads 2, 3, a slip occurs between the piston 25 and the piston seal 16, causing the original position of the piston 25 to shift relative to the caliper main body 6. As a result, even when the inner and outer brake pads 2, 3 wear, a pad clearance is adjusted to a constant amount.

Next, an action of the parking brake to hold a braking state so as to maintain a stop state of the vehicle, which is achieved with the disc brake 1 according to this embodiment, is described.

When the electronic control unit 51 receives an apply command (parking brake actuation command) output as a result of, for example, an operation of the parking switch 52 under a state in which the parking brake is released, the electronic control unit 51 energizes the electric motor 48 of the motor gear unit 49 to rotate the spindle 60 in an applying direction. Then, a rotational torque transmitted to the spindle 60 is transmitted to the nut member 61 via the thread engagement portion between the male thread portion 63 of the spindle 60 and the female thread portion 68 of the nut member 61.

In this case, the nut member 61 is supported by the rotation stopping member 75 so as to be nonrotatable relative to the piston 25 and movable in the axial direction relative to the piston 25. Thus, the nut member 61 moves toward another end side. As a result, the nut member 61 moves together with the piston 25 toward another end side while the inclined surface 72 of the nut member 61 is pressing the second tapered surface 39 of the piston 25 and the nut member 61 is being aligned with the piston 25. Then, when the piston 25 slides toward another end side and presses the inner brake pad 2, the disc rotor D is pressed between the inner and outer brake pads 2, 3 to thereby generate a braking force as described above.

When the pressing force of the nut member 61 on the piston 25, in other words, the braking force reaches a predetermined value set in advance, the electronic control unit 51 stops the energization of the electric motor 48 of the motor gear unit 49 to thereby stop the drive (rotation) of the spindle 60 in the applying direction. Further, the electronic control unit 51 can calculate a pressing force of the nut member 61 on the piston 25 (thrust of the nut member 61) based on, for example, a current value through the electric motor 48.

Further, as described above, the thread engagement portion between the male thread portion 63 of the spindle 60 and the female thread portion 68 of the nut member 61 is set to have the reversed efficiency of 0 or smaller. Thus, the rotational torque of the spindle 60 can be converted into thrust of the nut member 61 in the axial direction toward another end side. However, the thrust of the nut member 61 in the axial direction cannot be converted into a rotational torque for the spindle 60. As a result, when the electronic control unit 51 stops the energization of the electric motor 48, the stop state can be maintained even with a reaction force of the disc rotor D against the pressing force via the piston 25. As a result, the piston 25 is retained in a braking position, and the actuation of the parking brake is completed.

Meanwhile, when the electronic control unit 51 receives a release command (parking brake release command) output through, for example, an operation of the parking switch 52, the electronic control unit 51 energizes the electric motor 48 of the motor gear unit 49 to rotate the spindle 60 in a releasing direction. A rotational torque transmitted to the spindle 60 is transmitted to the nut member 61 via the thread engagement portion between the male thread portion 63 of the spindle 60 and the female thread portion 68 of the nut member 61. Then, when the nut member 61 moves toward one end side, the pressing force of the inner and outer brake pads 2, 3 on the disc rotor D is released. When an initial state in which a predetermined distance (clearance) is secured between the inclined surface 72 of the nut member 61 and the second tapered surface 39 of the piston 25 is restored, the electronic control unit 51 stops the energization of the electric motor 48 of the motor gear unit 49.

The above-mentioned disc brake 1 according to this embodiment includes the nut member 61, the rotation stopping member 75, the flat surface portions 36, 36, and the fixing member 84. The nut member 61 thrusts the piston 25 through the rotation of the spindle 60 driven by the electric motor 48. The rotation stopping member 75 restricts the rotation of the nut member 61 relative to the piston 25. The flat plate portions 36, 36 are formed on the inner side of the piston 25, and restrict the rotation of the rotation stopping member 75 and stop the rotation stopping member 75 through engagement. The fixing member 84 restricts the movement of the rotation stopping member 75 in the axial direction relative to the piston 25. This configuration eliminates the need of an engagement protruding portion that protrudes radially outward for the nut member 61, as otherwise required in the related art. Thus, the number of manufacturing steps (processing steps) for the nut member 61 is decreased, and thus the nut member 61 can easily be manufactured, resulting in a reduction in manufacturing cost of the nut member 61. Further, an engagement recessed portion, which is required in the related art, is not required for the inner peripheral surface of the piston 25. A large thickness can be secured for an outer peripheral part of the bottom portion 26 of the piston 25, and hence ease of forging can be improved. Still further, one kind of nut member 61 is used regardless of a size of the piston 25. Thus, the number of components can be decreased to reduce work such as control of the components. Further, the fixing member 84 is provided separately from the piston 25. Thus, the piston 25 is not required to be processed with high accuracy, and hence manufacturing cost of the piston 25 can also be reduced.

Further, in the disc brake 1 according to this embodiment, the rotation stopping member 75 is in the axial direction pressed against and retained at the abutment portion 83 between the outer peripheral edge of the rotation stopping member 75 on another end side and the first tapered surface 34 of the piston 25 by the fixing member 84. As a result, the movement of the rotation stopping member 75 in the axial direction relative to the piston 25 can be restricted with a simple structure.

Further, in the disc brake 1 according to this embodiment, the rotation of the rotation stopping member 75 is restricted by the flat surface portions 36 of the inner peripheral surface of the large-diameter opening portion 31 of the piston 25, and a structure of the restriction of the rotation is not complicated. Thus, manufacturing cost can be reduced. Further, the rotation stopping member 75 restricts the rotation of the nut member 61 relative to the piston 25 and allows the movement of the nut member 61 in the axial direction simply through the engagement with the flat surface portions 36 of the inner peripheral surface of the large-diameter opening portion 31 of the piston 25. This configuration can also reduce the manufacturing cost because of its simple structure and easy assembly.

Still further, in the disc brake 1 according to this embodiment, the distal ends of the protruding portions 86 of the fixing member 84 plastically deform the flat surface portions 36 in such a manner as to push into the flat surface portion 36 of the inner peripheral surface of the large-diameter opening portion 31 of the piston 25. The restoring forces of the protruding portions 86 of the fixing member 84 urge the rotation stopping member 75 toward the abutment portion 83 between the outer peripheral edge of the rotation stopping member 75 on another end side and the first tapered surface 34 of the piston 25. As a result, the fixing member 84 can restrict the movement of the rotation stopping member 75 in the axial direction relative to the piston 25.

Next, a disc brake 1 according to another embodiment of the present invention is described with reference to FIG. 7. In the description of the disc brake 1 according to another embodiment, only differences from the disc brake 1 illustrated in FIG. 1 to FIG. 6 are described.

The disc brake 1 according to another embodiment does not include the fixing member 84 that restricts the movement of the rotation stopping member 75 in the axial direction relative to the piston 25, which is included in the disc brake 1 illustrated in FIG. 1 to FIG. 6. In the disc brake 1 according to this embodiment, the rotation stopping member 75 is arranged at a position (abutment portion 83) between an inner peripheral surface of a large-diameter opening portion 31 of a piston 25 and an outer peripheral surface of a nut member 61, at which an outer peripheral edge of the rotation stopping member 75 on another end side is in abutment against a first tapered surface 34 of the piston 25.

After that, when flat surface portions 36 are bent radially inward at one end of the large-diameter opening portion 31 of the piston 25, bulging portions 89 that protrude inward are formed. In this embodiment, the bulging portions 89 are formed at four positions so as to correspond to the flat surface portions 36. However, the bulging portions 89 are not limited to such arrangement as long as the bulging portions 89 are form at two or more positions. An inclined surface 29 is formed on an outer peripheral surface on one end side of the piston 25. A thickness of the piston 25 at its one end is set to be sufficiently small. Thus, one end of the large-diameter opening portion 31 of the piston 25 can easily be bent inward to form the bulging portions 89. The bulging portions 89 and the abutment portion 83 can restrict the movement of the rotation stopping member 75 in the axial direction relative to the piston 25. Each of the bulging portions 89 of the large-diameter opening portion 31 of the piston 25 corresponds to a fixing portion.

Figure 7:
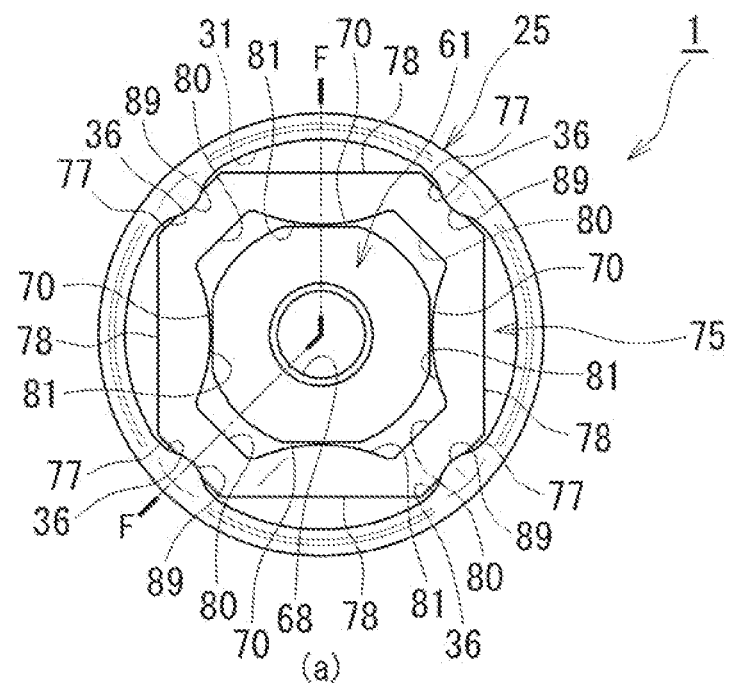
FIGS. 7(*a*) and 7(*b*) are views for illustrating an interior of a piston of a disc brake according to another embodiment of the present invention, in which FIG. 7(*a*) is an end view for illustrating the interior of the piston and FIG. 7(*b*) is a sectional view taken along the line F-F of FIG. 7(*a*).
Figure 7:
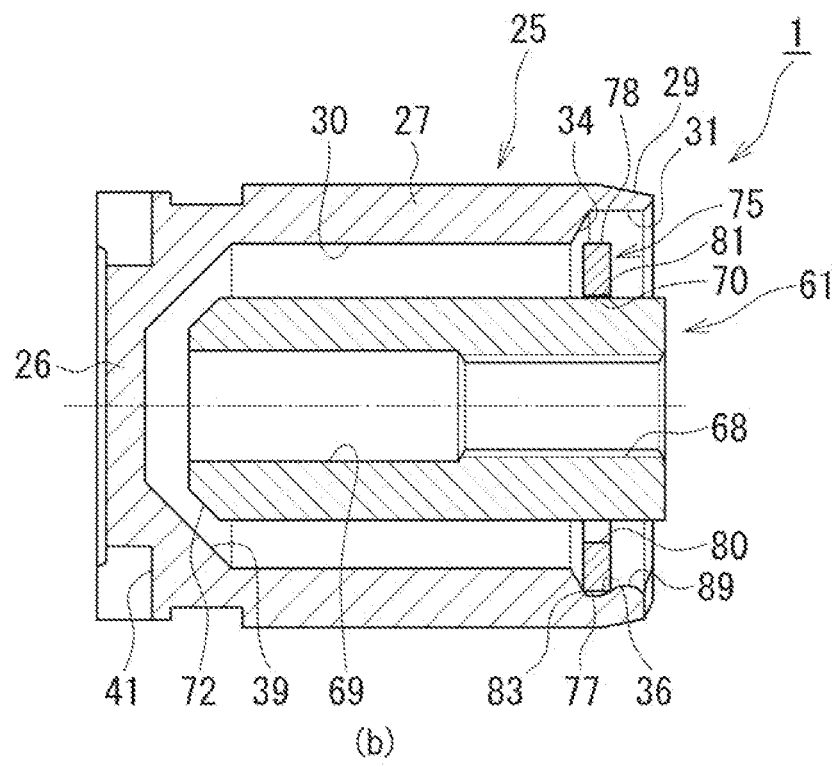

In the disc brake 1 according to the embodiment illustrated in FIGS. 7, when the flat surface portions 36 are bent radially inward at one end of the large-diameter opening portion 31 of the piston 25, a plurality of bulging portions 89 are formed. The bulging portions 89 can restrict the movement of the rotation stopping member 75 in the axial direction relative to the piston 25. As a result, although one step is additionally required for assembly, total manufacturing cost can be reduced because of the absence of the fixing member 84 (see FIG. 1).

As the above-mentioned disc brake 1 according to this embodiment, for example, the following aspects are conceivable.

According to a first aspect, there is provided a disc brake including: a piston (25), which has a bottomed cylindrical shape, and is configured to press braking members (2, 3) against a braked member (D); a thrust member (61) configured to thrust the piston (25) through rotation of a rotary member (60) driven by an electric machine (48); a rotation stopping member (75) configured to restrict rotation of the thrust member (61) relative to the piston (25); an engaging portion (36), which is formed on an inner side of the piston (25), and is configured to restrict rotation of the rotation stopping member (75) and stop the rotation stopping member (75) through engagement; and a fixing portion (84, 89) configured to restrict movement of the rotation stopping member (75) in an axial direction relative to the piston (25).

According to a second aspect, in the first aspect, the fixing portion (84, 89) is a fixing member (84) separate from the piston (25).

According to a third aspect, in the second aspect, the rotation stopping member (75) is in the axial direction pressed against and retained at an abutment portion (83) between the rotation stopping member (75) and the piston (25) by the fixing member (84).

According to a fourth aspect, in the first aspect, the fixing portion (84, 89) is a portion (89) formed by inwardly bending an inner peripheral surface of an opening portion (31) of the piston (25) in a radial direction of the piston (25).

According to a fifth aspect, in any one of the first to fourth aspects, the engaging portion (36) is a flat surface portion (36) being at least a part of an inner peripheral surface of an opening portion (31) of the piston (25).

According to a sixth aspect, in the fifth aspect, the rotation stopping member (75) is engaged with the flat surface portion (36) to restrict rotation of the thrust member (61) and allow the thrust member (61) to move in the axial direction.

According to a seventh aspect, in the fifth or sixth aspect, the fixing portion (84) has a protruding portion (86) extending in a radial direction of the piston (25), and the protruding portion (86) plastically deforms the flat surface portion (36) to restrict the movement of the rotation stopping member (75) in the axial direction.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

REFERENCE SIGNS LIST 1 disc brake, 2 inner brake pad (braking member), 3 outer brake pad (braking member), 25 piston, 31 large-diameter opening portion, 36 flat surface portion (engaging portion), 48 electric motor (electric machine), 50 rotary-to-linear motion conversion mechanism, 60 spindle (rotary member), 61 nut member (thrust member), 75 rotation stopping member, 83 abutment portion, 84 fixing member, 86 protruding portion, 89 bulging portion (fixing portion), D disc rotor (braked member)

The invention claimed is:

1. A disc brake, comprising:
   a piston, which has a bottomed cylindrical shape, and is configured to press braking members against a braked member;
   a thrust member configured to thrust the piston through rotation of a rotary member configured to be driven by an electric machine;
   a rotation stopping member configured to restrict rotation of the thrust member relative to the piston;
   an engaging portion, which is on an inner side of the piston, and is configured to restrict rotation of the rotation stopping member through engagement; and
   a fixing member, which is separate from the piston and the rotation stopping member, and is configured to restrict movement of the rotation stopping member in an axial direction relative to the piston.

2. The disc brake according to claim 1, wherein the rotation stopping member is configured to be pressed in the axial direction against and retained at an abutment portion between the rotation stopping member and the piston by the fixing member.

3. The disc brake according to claim 2, wherein the engaging portion is a flat surface portion defining at least a part of an inner peripheral surface of an opening portion of the piston.

4. The disc brake according to claim 1, wherein the engaging portion is a flat surface portion defining at least a part of an inner peripheral surface of an opening portion of the piston.

5. The disc brake according to claim 4,
   wherein the fixing member has a protruding portion extending in a radial direction of the piston, and
   wherein the protruding portion is configured to plastically deform the flat surface portion to restrict the movement of the rotation stopping member in the axial direction.

6. The disc brake according to claim 4, wherein the rotation stopping member is configured to engage with the flat surface portion to restrict rotation of the thrust member and allow the thrust member to move in the axial direction.

7. The disc brake according to claim 6,
   wherein the fixing member has a protruding portion extending in a radial direction of the piston, and
   wherein the protruding portion is configured to plastically deform the flat surface portion to restrict the movement of the rotation stopping member in the axial direction.

8. The disc brake according to claim 3, wherein the rotation stopping member is configured to engage with the flat surface portion to restrict rotation of the thrust member and allow the thrust member to move in the axial direction.

9. The disc brake according to claim 8,
   wherein the fixing member has a protruding portion extending in a radial direction of the piston, and
   wherein the protruding portion is configured to plastically deform the flat surface portion to restrict the movement of the rotation stopping member in the axial direction.

* * * * *